J. D. Johnson.
Harrow.
No. 88,301.    Fig. 1.    Patented Mar. 30, 1869.
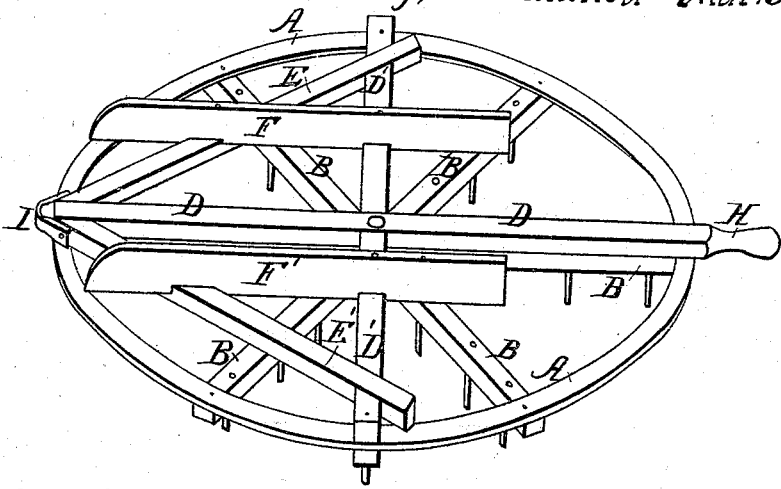
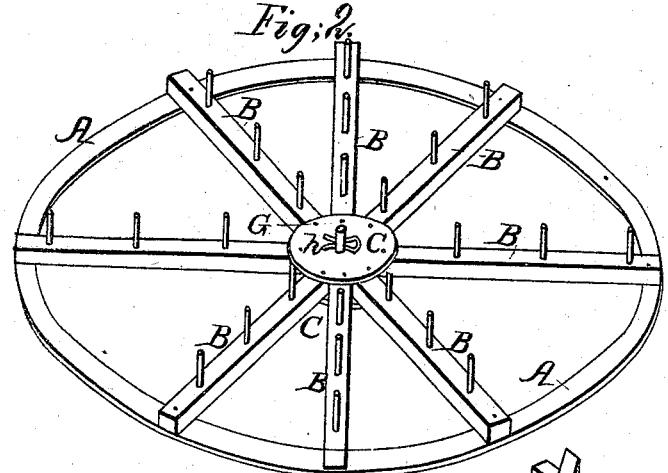
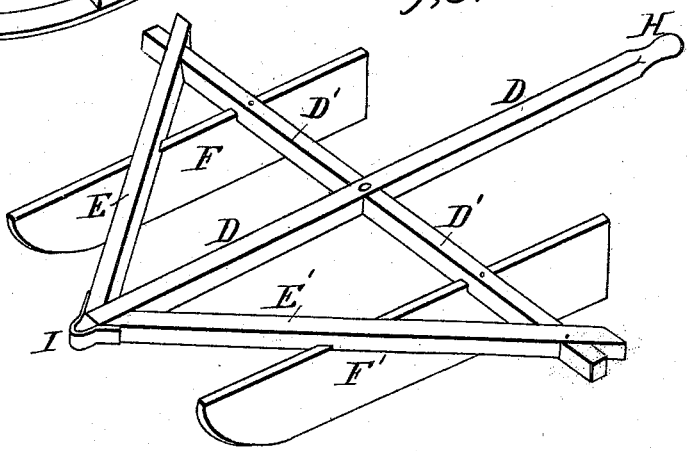
Witnesses.
John Bulkley
Frank Trigg
Inventor.
J. D. Johnson

JACOB D. JOHNSON, OF TYLERSVILLE, PENNSYLVANIA.

Letters Patent No. 88,301, dated March 30, 1869.

IMPROVEMENT IN PORTABLE FIELD-HARROW.

The Schedule referred to in these Letters Patent and making part of the same.

*To all whom it may concern:*

Be it known that I, JACOB D. JOHNSON, of Tylersville, in the county of Clinton, and State of Pennsylvania, have invented a new and useful "Portable Field-Harrow," consisting of a harrow and sled combined; and I do hereby declare that the following is a full and exact description thereof, reference being had to the accompanying drawings, and to the letters of reference marked thereon, in which—

Figure 1 represents a perspective view of the harrow and sled combined;

Figure 2, a perspective view of the harrow reversed and alone; and

Figure 3, a perspective view of the sled.

Similar letters of reference indicate corresponding parts.

The nature of my invention consists in attaching, to a circular harrow, a sled, by means of which the harrow can be moved conveniently from place to place.

In the accompanying drawings—

A represents the metal band, or tire of the harrow, and

B, the arms, the outer ends of which it binds.

These arms meet in the centre of the harrow, and are held together by means of the metal plates, or clamps C, to which they are bolted.

The lower sides of the arms B are provided with a suitable number of harrow-pins.

The cross-beams, D and D', and their braces, E and E', form the frame of the sled, and F F' are its runners.

The sled is inverted, and placed on top of the harrow, and is attached thereto by means of the bolt G, which runs through the harrow-frame where the beams D and D' intersect each other, and through the centre of the metal plates, or clamps C, as shown in fig. 1, and is held there by the pin $h$, running through an eye in its end.

The long end of the cross-beam D, of the harrow-frame, projects beyond the metal band, or tire, and forms the handle H, by means of which the driver can raise the harrow from behind when necessary.

The short end of this beam and the ends of the braces E and E' are mortised together, and are bound with the clevis-shaped metal plate I, to which the working-team is hitched.

The sled-frame tends to keep the harrow steady while in motion, and the long end of the beam D prevents the straining of the bolt G.

The harrow can be readily moved from place to place by turning it over on its runners.

What I claim as my invention, and desire to secure by Letters Patent, is—

A portable field-harrow, consisting of a rotary harrow and sled, constructed, arranged, and combined in the manner shown, and for the purposes herein set forth and described.

In testimony that I claim the foregoing invention, I have hereunto set my hand, this 30th day of September, 1868.

J. D. JOHNSON.

Witnesses:
FRANK TRIGG,
JOHN BULKLEY.